TONE CONTROLLED TELEPHONE ANSWERING DEVICE

Filed June 15, 1953 2 Sheets-Sheet 1

INVENTOR.
JOSEPH J. ZIMMERMANN
BY Andrus & Sceales
ATTORNEYS

Aug. 19, 1958 J. J. ZIMMERMANN 2,848,541

TONE CONTROLLED TELEPHONE ANSWERING DEVICE

Filed June 15, 1953 2 Sheets-Sheet 2

INVENTOR.
JOSEPH J. ZIMMERMANN
BY Andrus & Sceales
ATTORNEYS

United States Patent Office
2,848,541
Patented Aug. 19, 1958

2,848,541

TONE CONTROLLED TELEPHONE ANSWERING DEVICE

Joseph J. Zimmermann, Milwaukee, Wis., assignor to Electronic Secretary Industries, Inc., Waukesha, Wis., a corporation of Wisconsin Application June 15, 1953, Serial No. 361,593
16 Claims. (Cl. 179—6)

This invention relates to automatic telephone answering apparatus.

An object of the invention is to provide a telephone answering apparatus which does not interfere with regular telephone srevice.

Another object of the invention is to provide a telephone answering apparatus that may be safely connected directly in a conductive electrical circuit with the telephone line.

Another object of the invention is to provide a telephone answering apparatus with an outgoing message record player for the overall control of the automatic operation of the apparatus.

Another object of the invention is to provide a telephone answering apparatus that is extremely flexible and self synchronizing with respect to varying the timing cycle of the apparatus.

Another object of the invention is to provide a telephone answering apparatus with a minimum power consumption.

In general, the apparatus comprises a rectifier connected across the telephone lines and interconnected with suitable actuating, recording, and reproducing devices for transmitting a previously recorded message and for recording an incoming message. The timing for the recording of an incoming message is controlled by the cutting of the record. The record has an introductory message portion, followed by a high amplitude tone signal portion and then a closing message portion. The tone signal portion determines the length of time allotted for recording of an incoming message. The tone signal is fed through an amplifier to a relay which is employed to control the operation of the recording motor. The relay also controls the energization of other relays to insert a B+ voltage on the various tubes during the time period the apparatus is answering an incoming call.

Figure 1:
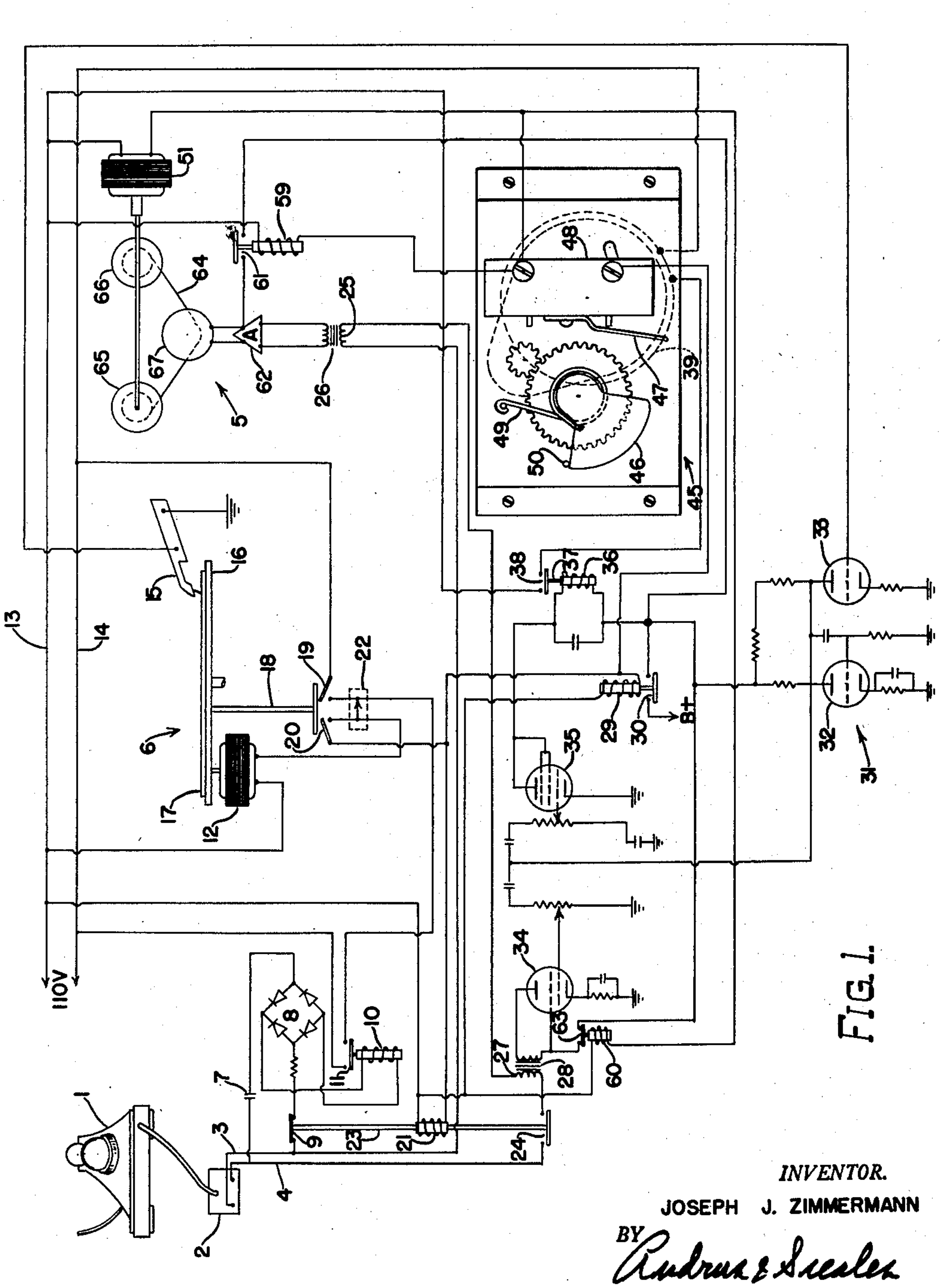
Figure 1 is a diagrammatic view of the apparatus.

Referring to the drawing, and particularly to Figure 1, there is shown a standard French-type telephone 1 connected to a standard telephone line block 2. The telephone answering apparatus is connected directly in the telephone line within the line block 2 by conductors 3 and 4.

In order to answer the telephone 1 and record incoming messages when the subscriber is absent, the apparatus is constructed with a recording means such as wire recorder 5 and means for reproducing a previously recorded message such as a turntable phonograph reproducer 6.

The conductors 3 and 4 are connected across the series connected condenser 7, rectifier 8 and normally closed relay contacts 9.

The condenser 7 blocks the D. C. current present in the telephone circuit from the telephone answering apparatus.

Rectifier 8 converts the A. C. current due to the ringing of the phone 1 to a D. C. current which is fed to D. C. relay winding 10. When relay winding 10 is energized, the contacts 11 close and connect the reproducer motor 12 across the A. C. supply lines 13 and 14.

The reproducer 6 may be of any suitable automatic variety. For example, the reproducer 6 illustrated in the drawing is of the phonograph type having a turntable mechanism, not shown, adapted to reset the phonograph tone arm 15 to the outside of the turntable 16 immediately upon completion of the playing of all recorded messages and movement of the tone arm 15 to the center of the turntable 16.

The motor 12 of reproducer 6 rotates the reproducer turntable 16. Rotation of the turntable 16 drops the tone arm 15 onto the record 17 and also causes pin 18 to drop and close switches 19 and 20. Pin 18 forms part of a clutch device, not shown, embodied in the turntable mechanism of reproducer 6. The operation of the illustrated turntable mechanism and pin 18 is more fully described in U. S. Patent No. 2,394,539 granted to J. Erwood et al., on February 12, 1946.

For the purposes of the present invention, it is thought sufficient to state that the pin 18 moves downwardly, closing switches 19 and 20, when the tone arm 15 is at the periphery of the turntable preparatory to the playing of the record 17. Further, the pin moves upwardly, opening switches 19 and 20, when the tone arm 15 is moved to the center of the record after the playing of the messages thereon and reset to the outside of the turntable.

Switch 19 is in parallel circuit with contacts 11 and connects the motor 12 directly to the supply line 14 to bypass the contacts 11. When switch 19 is closed, motor 12 operates independently of the ringing signal.

Switch 20 connects the relay winding 21 in parallel circuit with the phonograph motor 12 and across the supply lines 13 and 14.

A safety timing switch 22 is connected in series with the above described parallel circuits. As more fully described in my copending application Serial No. 117,759, filed on September 26, 1949, the safety switch 22 is adapted to remain closed during the entire normal period of operation of the apparatus. However, if a breakdown of the timing mechanism causes the apparatus to continue in operation for an abnormal period of time, the safety timing switch opens and shuts off the apparatus. As disclosed in my copending application referred to, the safety timing switch is preferably constructed with a synchronous motor, not shown, which drives an arm toward the switch and opens it after a predetermined period of time longer than the normal period of operation.

When the relay winding 21 is energized, the armature 23 retracts (upwardly in the diagram) and opens contacts 9 and closes relay contacts 24. Open contacts 9 disconnect the rectifier 8 from the telephone circuit. Closed contacts 24 place the series connected secondary winding 25 of recording transformer 26 and voice coil winding 27 of outgoing message transformer 28 across conductors 3 and 4.

With the recording transformer 26 and the outpoing message transformer 28 connected in a closed circuit across the telephone lines, messages are transmitted and received through suitable amplification means, as hereinafter described. In order to limit power consumption by the amplification means, a relay winding 29 is connected in parallel with relay winding 21 and is energized during the same period of the answering cycle. The relay winding 29 acts as a main control switch from the power supply. When energized, the relay winding 29 closes contacts 30 and thereby completes a circuit placing B+ voltage in the plate circuit of amplification means, as subsequently described.

To transmit the message on record 17, the tone arm 15 is in electrical connection with the two stage preamplifier 31; shown as triode tubes 32 and 33. The output of the preamplifier 31 is fed to outgoing message amplification tube 34 and the timing amplification tube 35.

The output of tube 34 is impressed on the telephone line by transformer 28 and transmits the recorded message from the record 17 to answer the phone.

A sensitive relay winding 36 preferably of a sensitive plate variety is connected in the plate circuit of the timing amplifier tube 35. The armature 37 of winding 36 controls contacts 38 which are connected in the energization circuit of timing motor 39.

Figure 2:
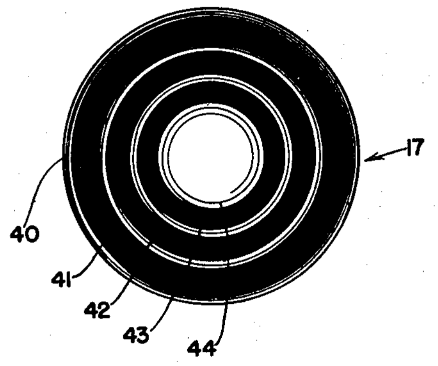
Fig. 2 is a plan view of a record with various message portions thereon.

The record 17 shown in Fig. 2 has a spiral lead in sound groove portion 40, an outgoing message portion 41, a high amplitude tone portion 42, a second outgoing message portion 43, and a spiral throwout groove 44.

The spiral lead in groove portion 40 allows time for the apparatus to change from standby condition to answering condition.

The outgoing message portion 41 may have any desired message thereon. Although the outgoing message is fed to the timing amplification tube 35, the relay winding 36 is not in an uninterrupted energized condition as the tube 35 is such that plate current flows only when a signal of predetermined amplitude is fed to the tube. Tube 35 is such that plate current flows only on the voice peaks of the outgoing message. The periodic closing of relay contacts 38 is permissible as hereinafter explained.

After the tone arm 15 traverses the outgoing message portion 41, it enters the high amplitude tone portion 42 and sends the tone signal to the outgoing message tube 34, and to timing amplification tube 35. The steady high amplitude signal permits a sufficient plate current to continuously energize winding 36 for the period of the high amplitude signal. Energization of winding 36 holds the contacts 38 closed and thereby closes the timing motor 39 energization circuit of the timing relay device 45.

Timing motor 39 through a suitable gear train rotates a cam 46. A switch arm 47 of switch 48 is positioned in the path of the rotating cam 46 and engaged thereby after a predetermined period of time of rotation. The cam 46 is spring loaded as by spring 49 which biases the cam to its initial position against a stop pin 50. The voice peaks of the outgoing message, as previously noted, apply a sporadic voltage and the cam is never advanced far enough to engage switch arm 47.

During the period of time that the switch 48 is closed, the recorder motor 51 is energized to record incoming messages. The energization circuit for recorder motor 51 is traced through the following series connected electrical elements in Fig. 1: starting with supply line 13, through the motor 51 and closed switch 48 to the side of relay winding 29 which is connected to one side of switch 20, then through closed switch 20, safety timing mechanism 22 and closed switch 19 to supply line 14.

With the timing device 45 controlling the operation of the recorder motor 51 by means of switch 48, the record wire, hereafter described, is conserved.

Figure 4:
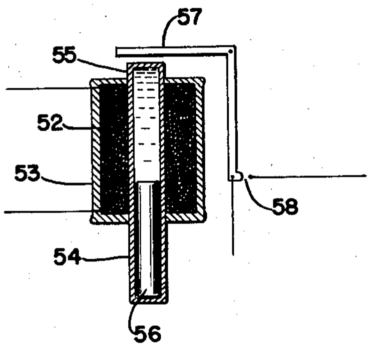
Fig. 4 is a sectional view of an alternative timing relay.
Figure 3:
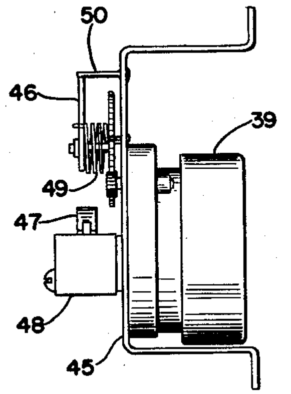
Fig. 3 is a side elevation of a timing relay controlled by the tone signal on the record.

Although a motor-cam timing device 45 is illustrated, any other suitable timing delay means may be employed, for example, an oil damped solenoid as illustrated in Fig. 4. Referring to Fig. 4, the solenoid construction and operation in replacing the motor-cam 45 is described as follows:

In Fig. 4, a solenoid winding 52 is housed in a suitable cylindrical casing 53 with a central opening therethrough. A preferably sealed tube 54 is secured to the casing 53 in any suitable manner; for example, welding, brazing or forcing the tube 54 into the opening. The tube 54 preferably extends out of each end of casing. A liquid 55 such as oil and a small plunger 56 fill the tube. The small plunger 56 normally rests in the base of tube 54 and preferably extends somewhat into the central opening of the casing.

The operation of the solenoid, as illustrated in Fig. 4 is described as follows: When the solenoid winding 52 is energized, the plunger 56 is attracted and moves upwardly through the liquid 55. After the plunger 56 has moved upwardly, preferably to the top of the tube 54, the inductance of the solenoid has increased sufficiently to pull in the armature 57. The movement of the armature 57 closes contacts 58. As applied to the present invention, the solenoid winding 52 would be connected in circuit in place of the motor 39 and the contacts 58 would replace the switch 48.

Referring again to Figure 1, closing of switch 48 energizes the relay winding 59 and relay winding 60 both of which are in parallel connection with the recorder motor 51. The energization circuits of relay windings 59 and 60 are the same as the circuit for the recorder motor 51, previously described, with the relay windings substituted for the recorder motor 51.

Energization of relay winding 59 causes the contacts 61 to close and places a B+ voltage on the recording amplifier 62. The wire recorder 5 is then in condition to record any incoming message dictated by the calling party.

Energization of relay winding 60 opens the contacts 63 and removes B+ voltage from the plate circuit of outgoing message tube 34. Removal of plate voltage from tube 34 mutes the tone of record 17 from the telephone line and the calling party may then give his message.

The wire recorder 5 may be any standard variety. The motor 51 is adapted to drive a record wire 64 that is wound on two spools 65 and 66 through the electromagnetic recording head 67. The incoming message is electrically picked up by the transformer 26 and fed to the recording head 67 through a suitable audio amplifier 62.

When the tone arm 15 moves past the high amplitude portion 42 of the record 17, the plate current in tube 35 discontinues and the contacts 38 open. Timing motor 39 is de-energized and the timing switch 48 opens. When timing switch 48 opens, the recorder 5 is returned to standby condition and B+ voltage is applied to outgoing message tube 34.

The outgoing message portion 43 is traversed by the tone arm 15 and the closing message transmitted to the calling party. After transmission of the outgoing message, the tone arm moves to the center of the record and is reset to the outside of turntable 16. As previously noted, the pin 18 retracts and opens switches 19 and 20 which returns the apparatus to standby condition.

The following is a description of the operation of the apparatus.

To install the apparatus, the conductors 3 and 4 are connected directly to the telephone lines. The cabinet containing the various elements of the apparatus may be positioned at any convenient location. The telephone may at all times be used manually and in the ordinary manner.

When the telephone subscriber is about to leave his office, he selects a record having the desired messages thereon and places the same on the turntable. The power supply, not shown, is turned on and the apparatus is in a standby condition for automatic operation.

When the telephone rings, the relay 10 is energized which places current on the reproducer motor 12. If the duration of the ring is sufficiently long, the record player will spin until the tone arm positions itself onto the lead in groove portion 40 of record 17. The turntable mechanism, not shown, operates to cause the pin 18 to depress and close switches 19 and 20.

The closing of switch 20 energizes relay winding 21 so that normally closed contacts 9 open and normally open contacts 24 close and operatively connect the outgoing message transformer 28 and recording transformer 26 with the telephone lines for transmission and receiving a telephone message. In this manner, a load is placed across the telephone lines which is equivalent to the removing of the handset from its cradle in a standard French type phone, as illustrated, and in effect the telephone is answered. When the telephone is answered, the incoming ringing signal discontinues in the ordinary manner.

Switch 19 completes a holding circuit when closed and maintains the energization of motor 12. The reproducer 6 plays the first outgoing message portion 41 which gives the desired information and requests that a message be left or the like. The message portion 41 may end with a message such as "at the end of the tone signal, please begin your message." The outgoing message is picked up by the tone arm 15 from the record and flows to the preamplifier 31, then to the outgoing message tube 34 and then to the calling party via the transformer 28.

As soon as the first recorded message is completed, the tone signal is similarly transmitted from the record to the calling party and also to the timing tube 35. Relay winding 36 is energized and holds the contacts 38 closed and consequently timing motor 39 is energized for the period of the tone signal.

The motor 39 causes the cam 46 to rotate and close switch 48 after a predetermined period of time. Switch 48, when closed, causes energization of recorder motor 51 and relay windings 59 and 60, as previously described.

The relay winding 60 holds the contacts 63 open and disconnects the output tube 34 from the B+ voltage and thus mutes the tone from the record 17 as to the calling party.

Energization of motor 51 and relay winding 59 puts the recorder 5 in operation and an incoming message is recorded on record wire 64 during the portion of the tone signal 42 on the record 17.

At the end of the tone signal, the timing relay switch 48 opens and disconnects the recorder 5 and places a B+ voltage on the output tube 34.

The closing or second recorded message 43 commences to play and is transmitted to the calling party.

The tone arm 15 then enters the spiral throwout grooves 44 and moves to the center of record 17 and is reset to normal standby position. The movement of tone arm 15 results in the retraction of pin 18 and the opening of switches 19 and 20. The reproducer motor and various relays are de-energized until another incoming call is received and the above cycle again is completed.

In the event that the pin 18 does not retract for some reason; for example, sticking of the tone arm 15, safety switch 22 will open and de-energize the apparatus to insure consequent disconnection of the apparatus.

Upon his return to the office, the subscriber turns a switch, not shown, to prevent further operation of the apparatus. The same or other switches are employed to cause the wire recorder 5 to play back all messages received in the absence of the subscriber.

The described telephone answering and message recording apparatus is safely connected directly in electrical conductive relation to the telephone line. The direct connection may be replaced by an inductive relation as shown in my previously referred to application.

The apparatus is completely de-energized while in standby condition except for the heating of the vacuum tube filaments, not shown. The power taken by the filaments is extremely low and therefore practically of no consequence. The auxiliary timing relay confines the energization of the various elements to the period of time in which they are performing a useful operation.

With the employment of the record as the basic timer and the timing relay as an auxiliary timer, the invention permits a wide variety of lengths and types of recorded answering messages without the necessity of any other adjustments.

Various embodiments of the invention may be employed within the scope of the accompanying claims.

I claim:

1. In an automatic telephone answering and message recording apparatus, a record with a previously recorded message and a continuous tone signal thereon, a reproducer connected in circuit with a telephone circuit to transmit said message thereover, a recorder electrically connected to said telephone circuit to record incoming messages, a timing relay operably connected in a circuit with the recorder and the reproducer to control operation of said recorder and to discontinue the transmission of said message in response to the presence of the continuous tone signal of said record for a predetermined period.

2. In an automatic telephone answering and message recording apparatus, a record with a previously recorded message and a continuous tone signal thereon, a reproducer for said record to transmit said message over a telephone circuit, an electrical circuit conductively connected to said telephone circuit and said reproducer operable upon receipt of an incoming ringing signal to set said reproducer into operation and to place a talking circuit across said telephone circuit, a recorder conductively connected to said telephone circuit to record an incoming message, and a timing relay electrically connected in circuit with said reproducer and sad recorder to discontinue transmission of said message over said telephone circuit and to place said recorder in operation in response to the presence of the continuous tone signal on said record for a predetermined period.

3. In a telephone answering and message recording device, a timing record with a recorded message and a tone signal thereon, a reproducer for said record connected in circuit with a telephone circuit to transmit the messages and tone signal, electromagnetic means in circuit with said telephone circuit and said reproducer being responsive to an incoming telephone signal to place a load across said telephone circuit equivalent to a normal telephone talking circuit load and set said reproducer into operating condition, a recorder connected in electrical circuit with said telephone circuit to record incoming telephone messages, and a timing relay in electrical connection with said reproducer and said recorder and responsive to the tone signal on said timing record to control operation of said recorder whereby said recorder is in operation only for the duration of the tone signal, said arrangement operating to prevent waste of the recorder record and insure against the undesired recording of outgoing messages.

4. An automatic telephone answering and message recording apparatus which comprises, a record with a message and a tone signal thereon, a reproducer for said record connected in a telephone circuit to reproduce the message thereover, means responsive to an incoming telephone signal to actuate said reproducer, means to maintain said reproducer in operation after a predetermined length of the incoming telephone signal independently of the incoming signal, means to close the telephone circuit after a predetermined period of operation of said reproducer, a recording device connected in the telephone circuit to record incoming messages, a timing relay in electrical connection with said reproducer and said recording device whereby said recorder operation is limited to the period of the tone signal and whereby the reproducer output is muted as to the telephone circuit after a predetermined period of said tone signal, and means to reset the apparatus to standby condition after the tone signal is discontinued.

5. In a telephone answering and message recording apparatus, a record with a recorded message and a tone signal thereon, a reproducer for said record electrically connected in circuit with a telephone circuit to transmit said recorded message and a portion of said tone signal thereover, means electrically connecting said reproducer and said telephone circuit to set said reproducer into operation in response to current flow in the telephone circuit caused by a ringing signal, means to maintain said rproducer in operation independently of said last named means after a predetermined period of operation, a recorder electrically connected to said telephone circuit to record incoming telephone messages, electromagnetic timing means electrically connecting said recorder and said reproducer and responsive to the playing of said tone signal to permit operation of said recorder during the playing of said tone signal and to mute the tone signal from the telephone circuit after a predetermined period of time, and switch means adjacent the turntable mechanism of said reproducer and actuated thereby upon the completion of said recorded message and said tone signal to disconnect the apparatus from said telephone circuit and to return the answering and message recording apparatus to standby condition.

6. In a telephone answering and message recording device, a record having a message and a tone signal and separate starting and terminal groove portions, a reproducer for said record to transmit said message and a portion of said tone signal over a telephone circuit, means electrically connected in circuit with said telephone circuit and said reproducer to set said reproducer in operation in response to an incoming ringing signal over said telephone circuit, holding means to maintain operation of said reproducer independently of said last named means after said reproducer has been started, means to complete a talking circuit across said telephone circuit after a predetermined period of operation of said reproducer, said reproducer having a pickup adapted to travel in said starting groove portion to engage said pickup with said message and tone signal portions and to move rapidly along said terminal groove portion to the center of said record immediately after traversing said message and tone signal portions, a recorder electrically connected to said telephone circuit to record an incoming telephone message, electromagnetic timing means connected electrically in circuit with said pickup and said recorder to limit the recorder operation to the duration of the tone signal, said timing means being connected to said reproducer to mute the tone signal in the telephone circuit after a predetermined period of time of the tone signal, and means to open said telephone circuit and said holding means in response to the movement of said pickup in said terminal groove portion.

7. In a telephone answering and message recording device, a record having two recorded message portions separated by a tone signal portion thereon, said record having a starting groove portion and a terminal groove portion, a reproducer for said record having a pickup adapted to traverse said portions of the record and thereby transmit said messages and said tone signal, electromagnetic means connecting said reproducer in circuit with a telephone circuit to start said reproducer in response to an incoming telephone signal, a holding circuit to maintain operation of said reproducer independently of said electromagnetic means after said reproducer is in operation, electromagnetic means to place a load across said telephone circuit to simulate the answering of an incoming telephone call as said pickup traverses said starting groove portion, an elctrical circuit connecting said pickup and said telephone circuit to transmit said two recorded messages and a portion of said tone signal, a recorder in circuit with said telephone circuit to record an incoming message, a timing relay electrically connected in circuit with said pickup and said recorder to limit the operation of the recorder to the tone signal portion of the record, said timing relay being connected to hold open said electrical pickup circuit until said pickup has traversed the tone signal portion after a predetermined portion of said tone signal has been transmitted and thereby mute the tone signal from the telephone circuit, and means to open said holding circuit and said electromagnetic means as said pickup traverses the terminal groove portion whereby said device is reset to a standby condition.

8. In an automatic telephone answering and message recording device, a record with two previously recorded messages separated by a tone signal, a reproducer for said record having a pickup adapted to traverse said record and transmit the sound therefrom, electromagnetic means conductively connected to a telephone circuit and said reproducer to initiate operation of said reproducer in response to incoming ringing currents, means to maintain operation of said reproducer independently of said electromagnetic means, means to place a load across the telephone circuit after a predetermined period of operation of said reproducer, an amplification circuit connecting said pickup and said telephone circuit to transmit said recorded messages and a portion of said tone signal, a recorder for recording a message dictated by an incoming caller, an amplification circuit connecting said recorder in said telephone circuit, a timing relay connected in a circuit with the recorder and said last named amplification circuit to control the operation of said recorder, a power supply to said amplification circuits having switch means to block amplification of said outgoing message in response to said timing relay whereby said recorder and amplification circuits are in operation only when performing the respective functions of recording and transmitting, and an amplification circuit connecting said timing relay and said pickup to control operation of said timing relay.

9. In an automatic telephone answering and message recording device, a recorder conductively connected to a telephone circuit to record an incoming message, a record having a previously recorded message and a tone signal thereon, a reproducer conductively connected in said telephone circuit to transmit said recorded message, the circuit between said reproducer and said telephone circuit including an audio amplifier to strengthen the voice currents of said message, a power supply, and relay means connecting said audio amplifier to the power supply and being responsive to said tone signal to effectively disconnect the output of said reproducer from the telephone circuit for the duration of the tone signal, said relay means being electrically connected to said reproducer.

10. In an automatic telephone answering and message recording device, a record having a previously recorded message and a tone signal thereon, a reproducer electrically connected in a telephone circuit to transmit said recorded message thereover, the circuit between said reproducer and said telephone circuit including amplification means to increase the strength of the voice currents of said message, a recorder electrically connected to said telephone circuit to record an incoming message, the circuit between said recorder and said telephone circuit including amplification means to increase the strength of the voice currents of said incoming message, and relay means connected to said reproducer to maintain operation of said record and said last named amplification means and to discontinue operation of said first named amplification means for the period of the tone signal, said arrangement operating to prevent waste of the recorder record and to reduce the power used by the device.

11. In an atomatic telephone answering and message recording device, a record with two previously recorded messages separated by a recorded tone signal thereon, a reproducer having a pickup conductively connected in circuit with a telephone circuit to transmit said messages and a portion of said tone signal thereover, the circuit between said reproducer and said telephone circuit having amplification means to increase the strength of the voice currents of said messages, a recorder conductively conected to said telephone circuit to record an incoming message, the circuit connecting said recorder and said telephone circuit including amplification means to increase the strength of the voice currents of said incoming messages, and electromagnetic timing means to control the operation of said recorder and said first and second amplification means, the pickup of said reproducer being connected in circuit with said electromagnetic means to operate said electromagnetic means in response to said tone signal, and said arrangement operating to conserve the recorder record and the power used by the device and to prevent the recording of said previously recorded messages.

12. In an automatic telephone answering and message recording device, a record having a previously recorded message and a previously recorded tone signal thereon, a reproducer having a pickup electrically connected in circuit with a telephone circuit to transmit said message thereover, the circuit between said reproducer and said telephone circuit including amplification means to increase the strength of the voice currents of said messages, a recorder electrically connected in circuit with the same telephone circuit to record an incoming message, the circuit between said recorder and said telephone circuit including amplification means to increase the voice currents of said incoming message, timing relay means connected in circuit with the pickup of said reproducer and operating in response to said tone signal to set said recorder and said last named amplification means in operation and to discontinue the operation of said first named amplification means, the circuit electrically connecting said timing relay means and said pickup including amplification means to increase the sound currents fed from said record to said timing relay means, a power supply for said amplification means, and relay means to connect said power supply to said amplification means when said reproducer is in operation whereby there is a minimum power consumption by the device.

13. In an automatic telephone answering and message recording apparatus, a record having two previously recorded messages thereon separated by a tone signal portion, a reproducer having a pickup in electrical connection with a telephone circuit to transmit said messages thereover, the electrical circuit between said reproducer and said telephone circuit including amplification means, a recorder electrically connected in circuit with said telephone circuit to record an incoming message, the circuit between said recorder and said telephone circuit including amplification means, a power supply for said amplification means, timing relay means electrically connected in circuit with said pickup and electrically connecting said power supply to said amplification means, said timing relay means being responsive to the tone signal on said record to discontinue operation of said first named amplification means and to maintain operation of said last named amplification means for the period of the tone signal, and an electrical circuit connecting said timing relay means in circuit with said recorder and a source of motive power whereby said recorder operation is limited to the tone signal portion of said record.

14. In an automatic telephone answering and message recording device, a record having two previously recorded messages thereon separated by a tone signal portion, a reproducer having a pickup electrically connected in a telephone circuit to transmit said messages thereover, the circuit between said pickup and said telephone circuit including amplification means, a recorder electrically connected in said telephone circuit to record incoming messages, the circuit between said recorder and said telephone circuit including amplification means, timing relay means electrically connected with said pickup, said timing relay being responsive to said tone signal to discontinue operation of said first named amplification means and to start and maintain operation of said second named amplification means for the duration of said tone signal, and said timing relay connected in circuit with said recorder to maintain operation thereof for the duration of the tone signal and to discontinue operation thereof in the absence of said tone signal, said arrangement preventing waste of the recorder record and minimizing the power consumption of the apparatus.

15. In a device of the class described, a sound recording a reproducer adapted to translate the recorded message from said recording into electrical signals, an electrical circuit connected to said reproducer to receive said electrical signals therefrom and to transmit the same as an outgoing message over a telephone line, a recorder associated with said electrical circuit to record an incoming message from the telephone line, means providing a continuous tone signal in said circuit upon completion of the outgoing message from said recording, and tone responsive means timed to be responsive to the presence of the continuous signal for a predetermined uninterrupted period to initiate actuation of said recorder.

16. In a device of the class described, a sound recording, a reproducer adapted to translate the recorded message from said recording into electrical signals, an electrical circuit connected to said reproducer to receive said electrical signals therefrom and to transmit the same as an outgoing message over a telephone line, a recorder associated with said electrical circuit to record an incoming message from the telephone line, a continuous tone signal on said recording at the end of said outgoing message, and means timed to be responsive to the presence of the continuous tone signal for a predetermined uninterrupted period to initiate actuation of said recorder.

References Cited in the file of this patent

UNITED STATES PATENTS

| | | |
|---|---|---|
| 2,525,763 | Beatty | Oct. 17, 1950 |
| 2,724,015 | Van Deventer | Nov. 15, 1955 |
| 2,793,252 | Augustadt | May 21, 1957 |